(12) United States Patent
Patel (10) Patent No.: US 11,673,655 B2
(45) Date of Patent: Jun. 13, 2023

(54) POWER-FREE UP-LOCK MECHANISM FOR LANDING GEAR

(71) Applicant: The Boeing Company, Chicago, IL (US)

(72) Inventor: Amar Patel, Bangalore (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/389,542

(22) Filed: Jul. 30, 2021

(65) Prior Publication Data
US 2022/0119098 A1    Apr. 21, 2022

Related U.S. Application Data

(60) Provisional application No. 63/093,604, filed on Oct. 19, 2020.

(51) Int. Cl.
*B64C 25/28*    (2006.01)
*B64C 25/26*    (2006.01)

(52) U.S. Cl.
CPC .............. *B64C 25/28* (2013.01); *B64C 25/26* (2013.01)

(58) Field of Classification Search
CPC ................................ B64C 25/26; B64C 25/28
See application file for complete search history.

(56) References Cited

U.S. PATENT DOCUMENTS

| | | | | |
|---|---|---|---|---|
| 2,720,369 | A * | 10/1955 | Detzer | B64C 25/26 74/532 |
| 3,504,406 | A * | 4/1970 | Schott | E05B 65/00 294/82.26 |
| 9,212,505 | B2 * | 12/2015 | Geng | E05B 47/0038 |
| 2003/0164422 | A1 * | 9/2003 | Collet | B64C 25/26 244/102 R |
| 2009/0284025 | A1 * | 11/2009 | Salcombe | E05B 47/0607 292/201 |
| 2017/0101172 | A1 * | 4/2017 | Walke | B64C 25/26 |
| 2021/0394891 | A1 * | 12/2021 | Wells | B64C 25/28 |
| 2022/0126986 | A1 * | 4/2022 | Gleave | B64D 45/0005 |

* cited by examiner

*Primary Examiner* — Richard G Davis
(74) *Attorney, Agent, or Firm* — McDonnell Boehnen Hulbert & Berghoff LLP (57) ABSTRACT

An up-lock apparatus for landing gear of an aircraft includes a hook member configured to receive an up-lock roller pin of the landing gear when the landing gear is retracted. An up-lock actuator is coupled to the hook member and is configured to maintain the hook member in a locked state responsive to a first movement of the up-lock roller pin against the hook member to thereby prevent deployment of the landing gear. The up-lock actuator is further configured to allow the hook member to move to a released state responsive to a second movement of the up-lock roller pin against the hook member to facilitate deployment of the landing gear.

20 Claims, 8 Drawing Sheets

POWER-FREE UP-LOCK MECHANISM FOR LANDING GEAR

RELATED APPLICATIONS

This application claims the benefit of priority under 35 U.S.C. § 119(e) of U.S. Provisional Application No. 63/093,604, filed Oct. 19, 2020, the content of which is incorporated herein by reference in its entirety.

FIELD

This application generally relates to aircraft landing gear systems. In particular, this application describes a power-free up-lock apparatus for landing gear of aircraft.

BACKGROUND

Some aircraft utilize retractable landing gear systems. The landing gear system may include an actuator that moves the landing gear between stowed and deployed states. For example, the actuator may be controlled in a first operation to cause the landing gear to be stowed within a landing gear bay of the aircraft. The actuator may be controlled in a second operation to cause the landing gear to deploy from the landing gear bay of the aircraft.

In some cases, the landing gear system may include an up-lock apparatus to maintain the landing gear in the landing gear bay during flight. Locking the landing gear in the landing gear bay (i) ensures that the landing gear will not inadvertently deploy, and (ii) facilitates de-energizing the landing gear actuator.

SUMMARY

In a first aspect, an up-lock apparatus for landing gear of an aircraft is disclosed. The up-lock apparatus includes a hook member configured to receive an up-lock roller pin of the landing gear when the landing gear is retracted. An up-lock actuator is coupled to the hook member and is configured to maintain the hook member in a locked state responsive to a first movement of the up-lock roller pin against the hook member to thereby prevent deployment of the landing gear. The up-lock actuator is further configured to allow the hook member to move to a released state responsive to a second movement of the up-lock roller pin against the hook member to facilitate deployment of the landing gear.

In a second aspect, an aircraft with landing gear is disclosed. The landing gear includes an up-lock roller pin. A hook member is configured to receive the up-lock roller pin of the landing gear when the landing gear is retracted. An up-lock actuator is coupled to the hook member and is configured to maintain the hook member in a locked state responsive to a first movement of the up-lock roller pin against the hook member to thereby prevent deployment of the landing gear. The up-lock actuator is further configured to allow the hook member to move to a released state responsive to a second movement of the up-lock roller pin against the hook member to facilitate deployment of the landing gear.

In a third aspect, a method for securing landing gear of an aircraft is disclosed. The method includes receiving, by a hook member, an up-lock roller pin of the landing gear when the landing gear is retracted. The method further includes maintaining, by an up-lock actuator coupled to the hook member, the hook member in a locked state responsive to a first movement of the up-lock roller pin against the hook member to thereby prevent deployment of the landing gear. The hook member is allowed to move to a released state responsive to a second movement of the up-lock roller pin against the hook member to facilitate deployment of the landing gear.

BRIEF DESCRIPTION OF THE FIGURES

The accompanying drawings are included to provide a further understanding of the claims, are incorporated in, and constitute a part of this specification. The detailed description and illustrated examples described serve to explain the principles defined by the claims.

DETAILED DESCRIPTION

Various examples of systems, devices, and/or methods are described herein. Words such as "example" and "exemplary" that may be used herein are understood to mean "serving as an example, instance, or illustration." Any implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to those of ordinary skill in the art, may occur in amounts that do not preclude the effect the characteristic was intended to provide.

Introduction

As noted above, landing gear systems may utilize an up-lock apparatus to lock the landing gear in a stowed state. In some cases, the up-lock apparatus may include a powered latch to secure the landing gear in the stowed state. For example, when stowing the landing gear, an up-lock roller pin of the landing gear may move into the up-lock apparatus as the landing gear moves to the stowed state. Afterward, a latch of the up-lock apparatus may be energized, or de-energized as the case may be, to maintain the up-lock roller pin in the up-lock apparatus, which prevents the landing gear from moving to a deployed state.

To deploy the landing gear, the latch may be de-energized, or energized as the case may be, to allow the up-lock apparatus to release the up-lock roller pin of the landing gear, which allows the landing gear to move to the deployed state.

The examples disclosed herein include an up-lock apparatus for maintaining landing gear in the stowed state without the use of an energized latch. For example, an up-lock apparatus may include a hook member and an actuator coupled to the hook member. The hook member is configured to receive an up-lock roller pin of the landing gear when the landing gear is retracted. The actuator is configured to maintain the hook member in a locked state responsive to a first movement of the up-lock roller pin against the hook member to thereby prevent deployment of the landing gear. The actuator is further configured to allow the hook member to move to a released state responsive to a second movement of the up-lock roller pin against the hook member to facilitate deployment of the landing gear.

Figure 1:
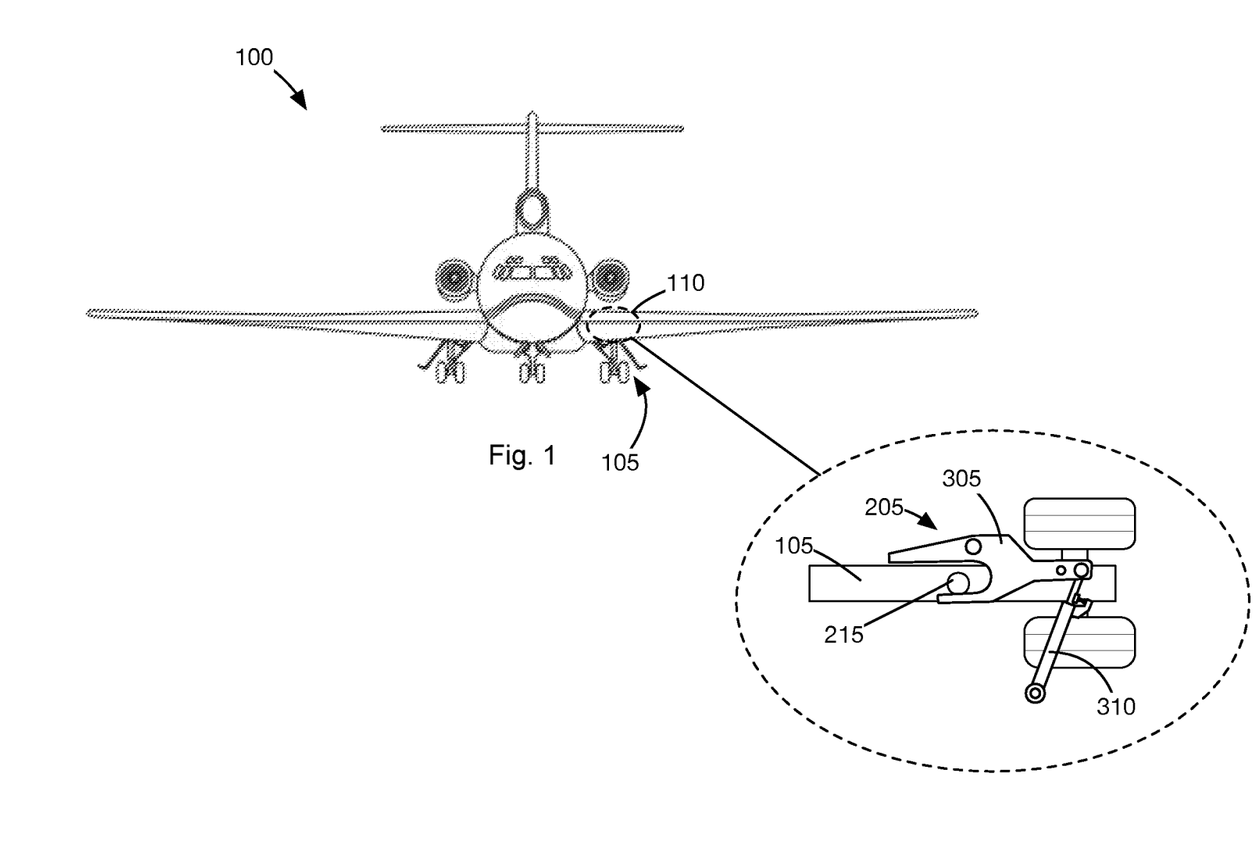
FIG. 1 illustrates an aircraft, in accordance with an example.

FIG. 1 illustrates an aircraft 100. The aircraft includes landing gear 105 and an up-lock apparatus 205. The up-lock apparatus 205 is utilized to secure the landing gear 105 in a stowed state. Landing gear 105 in the stowed state is illustrated in the dashed lines. The landing gear 105 includes an up-lock roller pin 215. The up-lock apparatus 205 includes a hook member 305 and an up-lock actuator 310. The hook member 305 is configured to receive the up-lock roller pin 215 of the landing gear 105 when the landing gear 105 is retracted. The up-lock actuator 310 is coupled to the hook member 305. The up-lock actuator 310 is configured to maintain the hook member 305 in a locked state responsive to a first movement of the up-lock roller pin 215 against the hook member 305 to thereby prevent deployment of the landing gear 105. The up-lock actuator 310 is further configured to allow the hook member 305 to move to a released state responsive to a second movement of the up-lock roller pin 215 against the hook member 305 to facilitate deployment of the landing gear 105.

In an example, the aircraft 100 may correspond to a large commercial passenger jet that includes a retractable landing gear system. In this regard, the landing gear 105 of the aircraft 100 may be arranged in the wings or in the fuselage of the aircraft 100. The landing gear 105 may be controlled to deploy, as illustrated, to support the weight of the aircraft 100. The landing gear 105 may be controlled to retract into, for example, a landing gear bay 110 of the aircraft 100, which may be arranged within the wings and/or fuselage of the aircraft 100.

It should be noted that while the examples described herein may be described in connection with a commercial passenger jet, the examples may be adapted for use in other types of aircraft. For example, the examples may be utilized in other aircraft 100 that utilize retractable landing gear such as cargo jets, small/private passenger jets, helicopters, etc.

Figure 2:
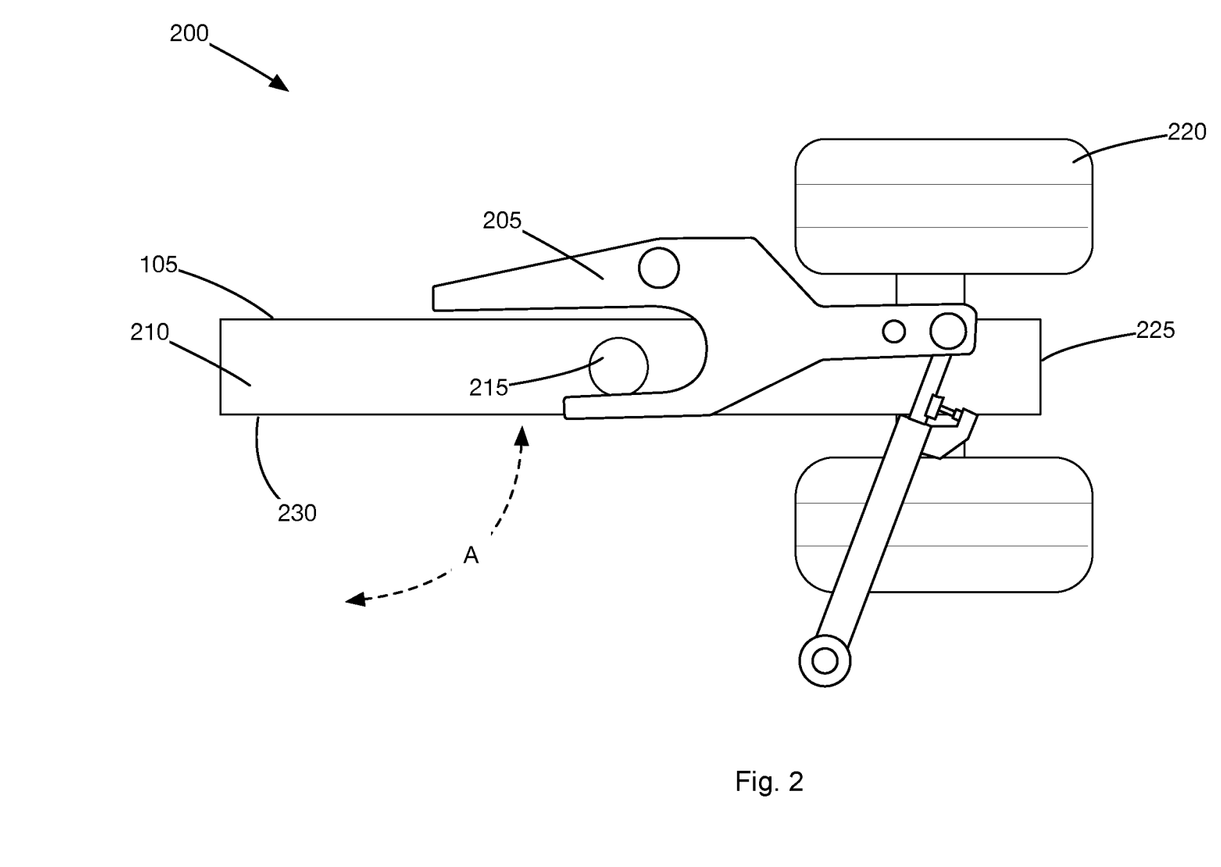
FIG. 2 illustrates a landing gear system, in accordance with an example.

FIG. 2 illustrates an example of a landing gear system 200. The landing gear system 200 includes landing gear 105 and an example of an up-lock apparatus 205. The landing gear 105 includes a strut 210, an up-lock roller pin 215, and wheels 220. The wheels 220 are coupled to a first end 225 of the strut 210. A second end 230 of the strut 210 may be coupled to an actuator (not shown) that controls the strut 210 to rotate in direction A between the deployed states (See FIG. 1) and stowed states. In the stowed state, the strut 210 may be controlled to come to rest in a generally horizontal position, as illustrated. In the horizontal position, the landing gear 105 may be entirely disposed with the landing gear bay 110 of the aircraft 100.

The up-lock roller pin 215 may be coupled to a central section of the strut 210. The up-lock roller pin 215 may be configured to engage the up-lock apparatus 205. When engaged, the up-lock apparatus 205 is configured to releasably secure the up-lock roller pin 215 and, therefore, secure the landing gear 105 in a generally horizontal position within the landing gear bay 110.

Figure 3:
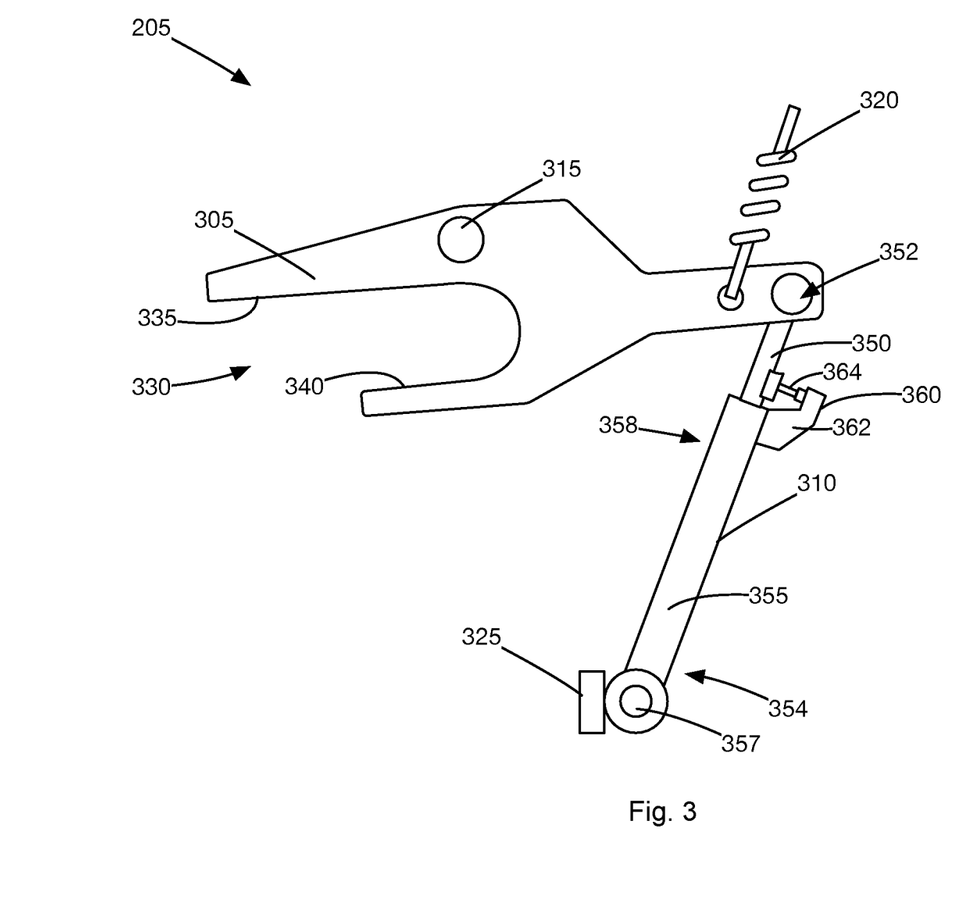
FIG. 3 illustrates an up-lock apparatus of the landing gear system of FIG. 2, in accordance with an example.

FIG. 3 illustrates an example of an up-lock apparatus 205 that may correspond to the up-lock apparatus 205 of FIG. 2. The up-lock apparatus 205 includes a hook member 305 and an up-lock actuator 310.

The hook member 305 may be configured to receive the up-lock roller pin 215 of the landing gear 105 when the landing gear 105 is retracted.

The up-lock actuator may be coupled to the hook member. The up-lock actuator may be configured to maintain the hook member in a locked state responsive to a first movement of the up-lock roller pin against the hook member to thereby prevent deployment of the landing gear. The up-lock actuator may be further configured to allow the hook member to move to a released state responsive to a second movement of the up-lock roller pin against the hook member to facilitate deployment of the landing gear.

Another example of the up-lock apparatus 205 may include a hook member 305, an up-lock actuator 310, a hook pin 315, a resilient member 320, and a sensor 325.

The hook member 305 is configured to receive the up-lock roller pin 215 of the landing gear 105 when the landing gear 105 is retracted. In this regard, the hook member 305 may define a jaw 330 having an upper-jaw section 335 and a lower-jaw section 340 configured to receive the up-lock roller pin 215 of the landing gear 105.

When receiving the up-lock roller pin 215, the hook member 305 is configured to pivot around the hook pin 315. In this regard, the upper-jaw section 335 may be configured to be engaged by the up-lock roller pin 215 during an upward movement of the up-lock roller pin 215 against the hook member 305. The lower-jaw section 340 is configured to support the up-lock roller pin 215 when the landing gear 105 is retracted to thereby maintain the landing gear 105 in the retracted state. In this regard, the hook member 305 may be formed from a material such as a metal material or other durable material suitable for supporting the landing gear 105. The hook member 305 and/or the lower-jaw section 340 of the hook member 305 may be dimensioned to support the weight of the landing gear 105.

Figure 4A:
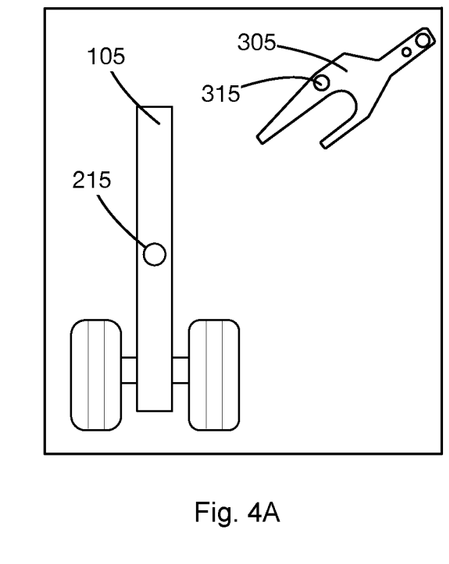
FIG. 4A is a first illustration of landing gear being retracted and secured by the up-lock apparatus, in accordance with an example.
Figure 4B:
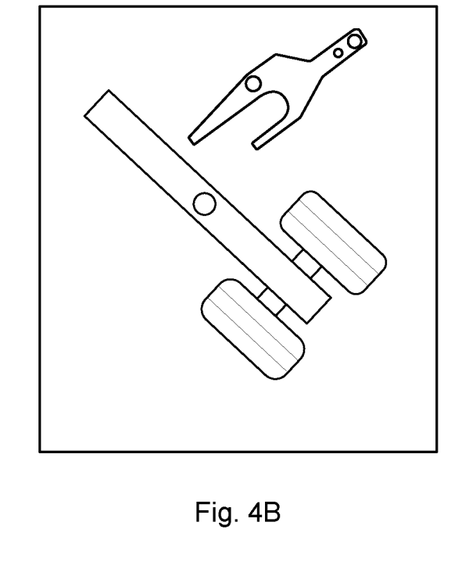
FIG. 4B is a second illustration of landing gear being retracted and secured by the up-lock apparatus, in accordance with an example.
Figure 4C:
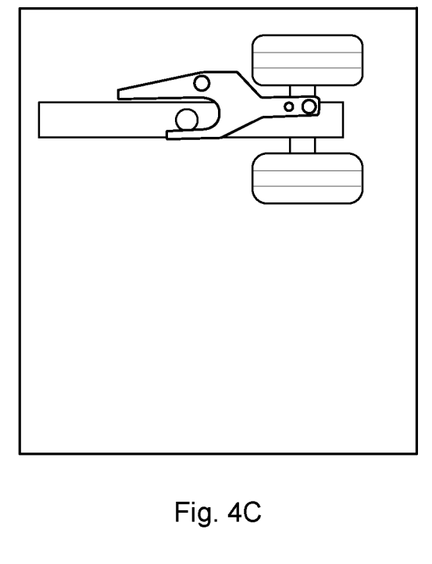
FIG. 4C is a third illustration of landing gear being retracted and secured by the up-lock apparatus, in accordance with an example.

FIGS. 4A-4C illustrates the hook member 305 receiving the up-lock roller pin 215 of the landing gear 105 when the landing gear 105 is retracted. In FIG. 4A, the landing gear 105 is deployed. In this situation, the hook member 305 is urged in a generally downward direction (i.e., the released state) by the resilient member 320 (FIG. 3). The hook member 305 may include features such as a stop (not shown) configured to maintain the hook member 305 in a position suitable for receiving the up-lock roller pin 215 of the landing gear 105 when urged by the resilient member 320 to the released state.

In FIG. 4B, the landing gear actuator is controlled to cause the landing gear 105 to begin a retraction operation. In FIG. 4C, the landing gear 105 is fully retracted. In the fully retracted state, the hook member 305 is rotated about the hook pin 315 to a locked state that corresponds to a generally horizontal position. In the locked state, the up-lock roller pin 215 is supported by the hook member 305 to maintain the landing gear 105 in the retracted state.

Returning to FIG. 3, the up-lock actuator 310 is coupled to the hook member 305. The up-lock actuator 310 may include a piston rod 350, which is part of a piston 702 (FIG. 7), and a cylinder 355. In some examples, the up-lock actuator 310 may include an auxiliary locking mechanism 360. The piston rod 350 is configured to be moveable relative to the cylinder 355 between a retracted position and an extended position.

Figure 7:
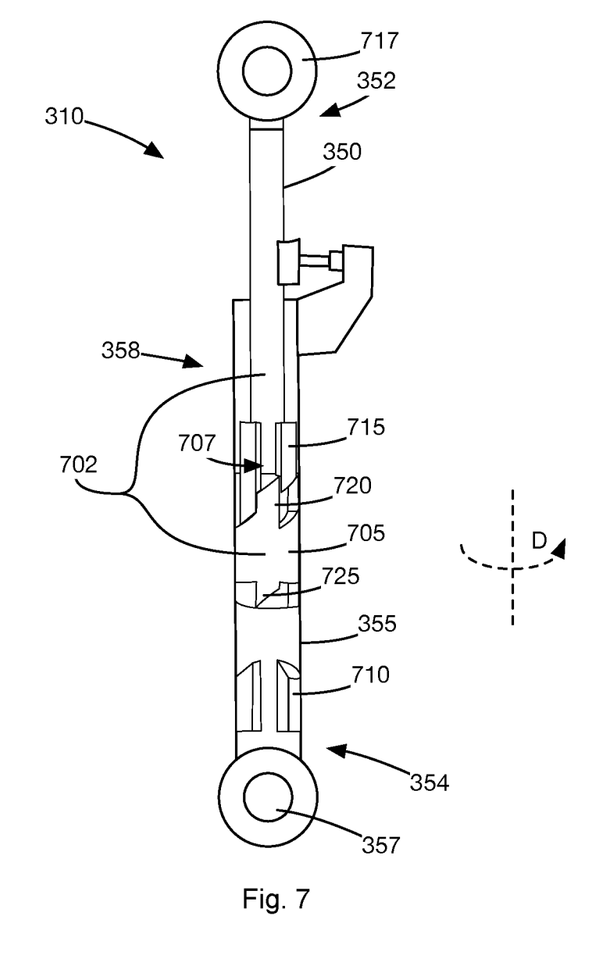
FIG. 7 illustrates the interior of an up-lock actuator, in accordance with an example.

A first end 352 of the piston rod 350 may be configured to rotatably couple to the hook member 305. In this regard, the first end 352 may include a coupler 717 (FIG. 7). The coupler 717 (FIG. 7) may be rotatably coupled to the first end 352 of the piston rod 350. The coupler may facilitate rotatably coupling the piston rod 350 to the hook member 305 according to two degrees of freedom. A second end 707 of the piston rod 350 may be coupled to a piston head 705 (FIG. 7), details of which are provided below. The piston head 705 is disposed within the cylinder 355.

The cylinder 355 may include a closed cap-end 354 and an opening at a rod-end 358 through which the piston rod 350 extends. The cap-end 354 of the cylinder 355 may include a coupler 357 that facilitates rotatable coupling of the cap-end 354 of the cylinder 355 to a structure (not shown) within the landing gear 105 of the aircraft 100.

The cylinder 355 may be filled with a fluid such as hydraulic fluid that facilitates smooth transitioning of the piston rod 350 between the retracted position and the extended position. The hydraulic fluid may further help prevent corrosion from developing within the cylinder 355 and/or on the piston rod 350 or piston head 705 that may inhibit movement of the piston rod 350 within the cylinder 355.

In operation, the up-lock actuator 310 is configured to alternate the hook member 305 between one of two states responsive to movement of the up-lock roller pin 215 against the hook member 305. For example, a first movement of the up-lock roller pin 215 against the hook member 305 may cause the hook member 305 to move to a locked state to prevent deployment of the landing gear 105. A second movement of the up-lock roller pin 215 against the hook member 305 may cause the hook member 305 to move to a released state to facilitate deployment of the landing gear 105. A third movement of the up-lock roller pin 215 against the hook member 305 may cause the hook member 305 to move back to the locked state to prevent deployment of the landing gear 105. A fourth movement of the up-lock roller pin 215 against the hook member 305 may cause the hook member 305 to move back to the released state to facilitate deployment of the landing gear 105.

The auxiliary locking mechanism 360 may be provided in some examples where upside-down flight by the aircraft 100 is expected. For example, operations described herein with respect to the auxiliary locking mechanism 360 may be enabled when the aircraft 100 is flying upside down and disabled when the aircraft 100 is flying upright.

When enabled, the auxiliary locking mechanism 360 is configured to lock the piston rod 350 in the retracted position by, for example, preventing rotation of the piston rod 350. The auxiliary locking mechanism 360 may include a body member 362, an interference member 364 slidably coupled to the body member 362, and an actuator (not shown) for moving the interference member 364 within the body member 362. In operation, the actuator may be controlled to slide the interference member 364 relative to the body member 362 so that an interference end of the interference member engages the piston rod 350. In this regard, the piston rod 350 may define a feature proximate the first end 352 of the piston rod 350 for receiving the inference end of the interference member 364. In an example, the interference member 364 may correspond to a pin. The interference end of the interference member 364 may correspond to the tip of the pin, and the feature in the piston rod 350 may correspond to a recess. The actuator may cause the tip of the pin to slide within the recess to prevent the piston rod 350 from rotating and/or extending. To allow for extension of the piston rod 350, the actuator may be controlled to cause the inference member to slide away from the piston rod 350.

Figure 5A:
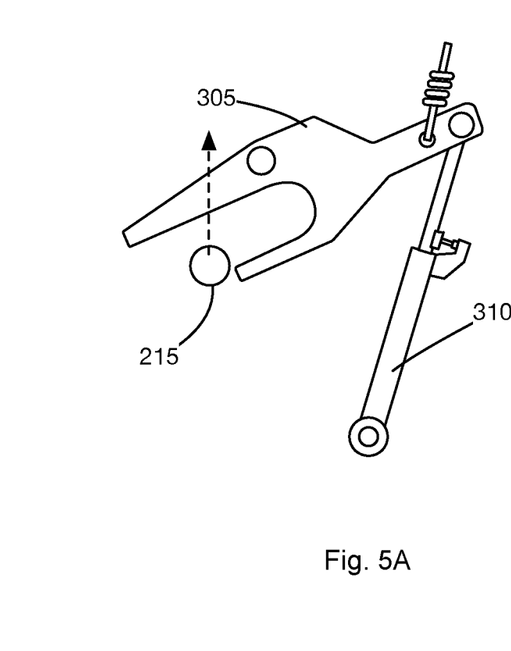
FIG. 5A is a first illustration showing a locking operation performed by an up-lock actuator of the up-lock apparatus, in accordance with an example.
Figure 5B:
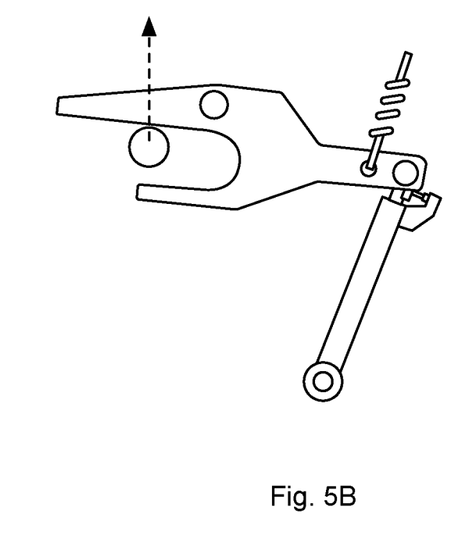
FIG. 5B is a second illustration showing a locking operation performed by the up-lock actuator, in accordance with an example.
Figure 5C:
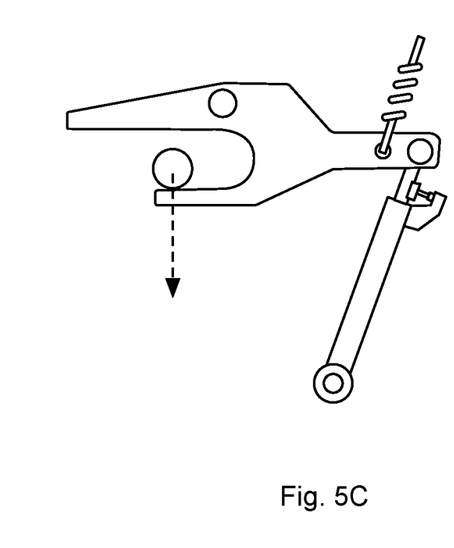
FIG. 5C is a third illustration showing a locking operation performed by the up-lock actuator, in accordance with an example.

FIGS. 5A-5C illustrate example locking operations performed by the up-lock actuator 310 described above.

FIG. 5A illustrates the hook member 305 of the up-lock apparatus 205 in a released state and the up-lock actuator 310 in the extended state. That is, the piston rod 350 of the up-lock actuator 310 is in a fully extended position. In FIG. 5A, the landing gear 105 of the aircraft 100 may be controlled to retract into the landing gear bay 110 of the aircraft 100. As such, the up-lock roller pin 215 of the landing gear 105 may be moving towards the hook member 305, as indicated by the direction indicator.

In FIG. 5B, continued upward movement of the up-lock roller pin 215 of the landing gear 105 causes the up-lock roller pin 215 to engage the upper-jaw section 335 of the hook member 305. The engagement by the up-lock roller pin 215 causes the hook member 305 to rotate about the hook pin 315 so that the upper-jaw section 335 moves in an upward direction with the up-lock roller pin 215. Rotation of the hook member 305 causes the piston rod 350 of the up-lock actuator 310 to retract within the cylinder 355. Once fully retracted, the up-lock actuator 310 enters a limited extension state. In FIG. 5B, the landing gear 105 is fully retracted within the landing gear bay 110 of the aircraft 100.

In FIG. 5C, the landing gear actuator may be de-energized. De-energization of the landing gear actuator may cause the landing gear 105 to begin moving in a downward direction due to the force of gravity. Under this situation, the up-lock roller pin 215 of the landing gear 105 begins to move in a downward direction as indicated by the direction indicator. The downward movement causes the hook member 305 to rotate about the hook pin 315 so that the upper-jaw section 335 moves in a downward direction with the up-lock roller pin 215. Rotation of the hook member 305 causes the piston rod 350 of the up-lock actuator 310 to extend to an extent. However, because the up-lock actuator 310 is in the limited extension state, the amount by which the piston rod 350 is allowed to extend is limited to prevent the hook member 305 from continually rotating in the downward direction with the up-lock roller pin 215. That is, the hook member 305 enters a locked state where it can no longer rotate in the downward direction with the up-lock roller pin 215. With continued movement, the up-lock roller pin 215 engages and comes to rest on the lower-jaw section 340 of the hook member 305. Support of the up-lock roller pin 215 by the lower-jaw section 340 of the hook member 305 prevents retraction of the landing gear 105 from the landing gear bay 110.

Figure 6A:
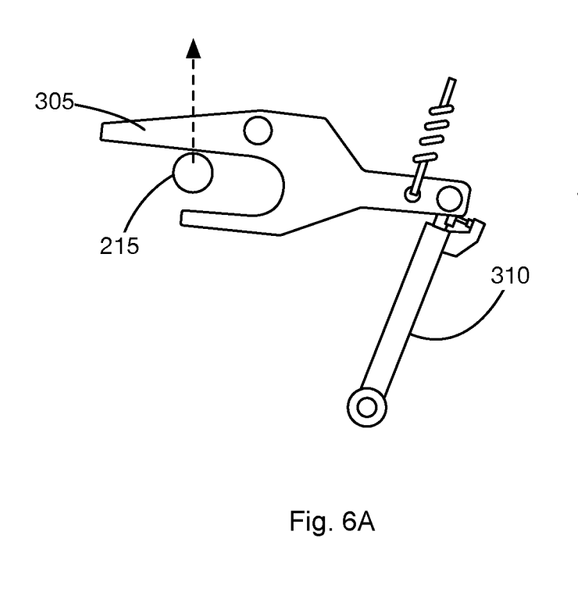
FIG. 6A is a first illustration showing a releasing operation performed by the up-lock actuator, in accordance with an example.
Figure 6B:
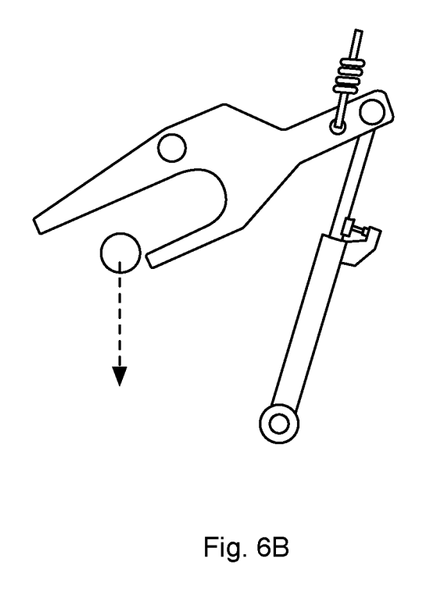
FIG. 6B is a second illustration showing a releasing operation performed by the up-lock actuator, in accordance with an example.

FIGS. 6A and 6B illustrate example releasing operations performed by the up-lock actuator 310 described above.

In FIG. 6A, the up-lock actuator 310 is initially in the limited extension state, which causes the hook member 305 to remain in the locked state. An initial operation for deploying the landing gear 105 from the landing gear bay 110 may be performed. During the initial operation, the landing gear actuator may be controlled to move the landing gear 105 in an upward direction to remove the weight of the landing gear 105 from the hook member 305. As the landing gear 105 moves upward, the up-lock roller pin 215 moves off of the lower-jaw section 340 and engages the upper-jaw section 335 of the hook member 305. Engagement of the upper-jaw section 335 causes the hook member 305 to rotate about the hook pin 315 so that the upper-jaw section 335 moves in an upward direction with the up-lock roller pin 215. Rotation of the hook member 305 causes the piston rod 350 of the up-lock actuator 310 to retract within the cylinder 355 and remove the up-lock actuator 310 from the limited extension state.

In FIG. 6B, a second operation for releasing the landing gear 105 from the landing gear bay 110 may be performed. During the second operation, the landing gear actuator may be de-energized or controlled to cause the release of the landing gear 105 from the landing gear bay 110. Under this situation, the up-lock roller pin 215 of the landing gear 105 begins to move in a downward direction as indicated by the direction indicator. The downward movement of the up-lock roller pin 215 causes the hook member 305 to rotate about the hook pin 315 so that the upper-jaw section 335 moves in a downward direction with the up-lock roller pin 215. Because the up-lock actuator 310 is no longer in the limited extension state, the up-lock actuator 310 is allowed to extend fully and, therefore, the hook member 305 is allowed to rotate to the released state. In the release state, the up-lock roller pin 215 of the landing gear 105 is allowed to move passed the lower-jaw section 340, which in turn allows the landing gear 105 to deploy.

Returning to FIG. 3, as indicated above, the resilient member 320 is configured to urge the hook member 305 towards the released state (See FIG. 4A). In this regard, the resilient member 320 may correspond to a spring such as a coil spring. The resilient member 320 may be formed from a durable material such as a metal material. The resilient member 320 may be dimensioned to facilitate rotation of the hook member 305 between the released state and the locked state.

The sensor 325 is in mechanical communication with the hook member 305. The sensor 325 is configured to facilitate the determination of whether the hook member 305 is in the locked state or the released state. For example, the sensor 325 may correspond to a rotary sensor. The rotary sensor may be positioned, for example, at the coupler 357 arranged at the cap-end 354 of the cylinder 355 to measure the amount by which the up-lock actuator 310 rotates. In another example, the rotary sensor may be position at the coupling between the hook member 305 and the first end 352 of the up-lock actuator 310. A first amount of rotation by the up-lock actuator 310 may indicate that the hook member 305 is in the released state. A second amount of rotation by the up-lock actuator 310 may indicate that the hook member 305 is in the locked state.

In yet another example, the sensor 325 may correspond to a switch that is engaged by the hook member 305 and/or the up-lock actuator 310 when the hook member 305 is in the release stated and/or locked state.

The sensor 325 may be in communication with a control system (not shown) and/or an indicator (not shown) of the aircraft 100. In this regard, the controller may include a processor and a non-transitory computer readable medium that stores instruction code executable by the processor that facilitates the performance, by the controller, of any of the controller related operations disclosed herein.

During a retraction operation, information provided by the sensor 325 (i.e., whether the hook member 305 is in the locked state), may be utilized by the controller to determine whether the landing gear 105 is locked within the landing gear bay 110. For example, during a landing gear retraction operation, the controller may wait until receiving an indication that the up-lock member is in the locked state before de-energizing the landing gear actuator to thereby prevent inadvertent deployment of the landing gear 105 from the landing gear bay 110. Information about the state of the hook member 305 of the up-lock apparatus 205 may be communicated to the pilot of the aircraft 100 via an indicator and may inform the pilot that the landing gear 105 is safely locked in the landing gear bay 110.

Conversely, during a landing gear deployment operation (e.g., FIGS. 6B and 6C), the controller may receive an indication that the hook member 305 of the up-lock apparatus 205 is not entering the release state. In this case, the controller may cause the landing gear 105 to move in a further upward direction in an attempt to cause the up-lock actuator 310 to leave the limited extension state and allow the hook member 305 to enter the release state. Information about the state of the hook member 305 may be communicated to the pilot of the aircraft 100 via an indicator and may inform the pilot that the landing gear 105 is safely deployed.

FIG. 7 illustrates an example of the interior of the up-lock actuator 310 that may correspond to the up-lock actuator 310 described above. The interior of the up-lock actuator 310 may include a piston 702, a cap-end cam profile 710, and a rod-end cam profile 715. The piston 702 includes a piston head 705 and a piston rod 350.

As noted above, the piston rod 350 of the up-lock actuator 310 may be configured to be moved longitudinally within the cylinder 355 of the up-lock actuator 310 between retracted and extended positions. The first end 352 of the piston rod 350 may be configured to be rotatably coupled to the hook member 305. A second end 707 of the piston rod 350 may be coupled to the piston head 705.

As noted above, the cylinder 355 may include a closed cap-end 354 and an opening at a rod-end 358 through which the piston rod 350 extends. The cap-end 354 of the cylinder 355 may include a coupler 357 that facilitates rotatable coupling of the cap-end 354 of the cylinder 355 to a structure (not shown) within the landing gear bay 110 of the aircraft 100. The cylinder 355 may be filled with a fluid such as hydraulic fluid that facilitates smooth transitioning of the piston rod 350 between the extended and retracted positions, and the prevention of the formation of corrosion within the cylinder 355.

The piston head 705 may be coupled to the second end 707 of the piston rod 350. The piston head 705 is configured to move longitudinally within the cylinder 355 between a cap-end 354 of the cylinder 355 and a rod-end 358 of the cylinder 355. In some examples, the piston head 705 includes a seal such as an elastomer seal (not shown) to prevent or control the flow of fluid passed the piston head 705.

In an example, the piston head 705 includes a piston head cam profile (720 and 725). The piston head cam profile (720 and 725) includes a rod-side cam profile 720 on the rod-side of the piston head 705, and a cap-side cam profile 725 on the cap-end side of the piston head 705. The rod-side cam profile 720 of the piston head 705 is configured to engage a rod-end cam profile 715 of the cylinder 355 arranged in the inside of the cylinder 355, proximate the rod-end 358 of the cylinder 355. The cap-side cam profile 725 of the piston head 705 is configured to engage a cap-end cam profile 710 of the cylinder 355 arranged on the inside of the cylinder 355, proximate the cap-end 354 of the cylinder 355.

The cap-side cam profile 725 of the piston head 705 and the cap-end cam profile 710 of the cylinder 355 are configured so that when the respective cam profiles 710 and 725 engage one another, the piston head 705 rotates along the indicated axis, D, within the cylinder 355 by a first amount. For example, after a first engagement of the cap-side cam profile 725 of the piston head 705 and the cap-end cam profile 710 of the cylinder 355, the piston head 705 may rotate 90 degrees to a first rotation state. After a second engagement of the cap-side cam profile 725 of the piston head 705 and the cap-end cam profile 710 of the cylinder 355, the piston head 705 may rotate 90 degrees from the first rotation state to a second rotation state. In an example where the piston head 705 rotates by 90 degrees, the piston head 705 may rotate back to the first rotation state after a fourth engagement of the cap-side cam profile 725 of the piston head 705 and the cap-end cam profile 710 of the cylinder 355.

In examples, the piston rod 350 rotates with the piston head 705, and the first end 352 of the piston rod 350 is rotatably coupled to the hook member 305 according to two degrees of freedom.

The rod-side cam profile 720 of the piston head 705 and the rod-end cam profile 715 of the cylinder 355 are configured to allow the piston rod 350 to fully extend when the piston head 705 is at, for example, the first rotation state, and to restrict the amount by which the piston rod 350 may extend when the piston head 705 is at the second rotation state.

In an example, the rod-end cam profile 715 of the cylinder 355 and the rod-side cam profile 720 of the piston head 705 may be configured to allow the piston head 705 to move past the rod-end cam profile 715 of the cylinder 355 when the piston is at the first rotation state. The rod-end cam profile 715 of the cylinder 355 and the rod-side cam profile 720 of the piston head 705 may be further configured to prevent the piston head 705 from moving past the rod-end cam profile 715 of the cylinder 355 when the piston head 705 is at the second rotation state.

In the example where the piston head 705 rotates by 90 degrees each time the cap-side cam profile 725 of the piston head 705 engages the cap-end cam profile 710 of the cylinder 355, the piston rod 350 may be allowed to fully extend when the piston is at the first and third rotation states, and the amount by which the piston rod 350 may extend may be restricted when the piston head 705 is at the second and fourth rotation states.

In examples, when allowed to extend fully, the piston rod 350 may be allowed to extend more than, for example, the 5 inches, 10 inches, 20 inches, or 50 inches. In examples, when the amount by which the piston rod is allowed to extend is restricted, the piston rod may be restricted to extending less than, for example, 1 inch, 2 inches, 4 inches, and 5 inches.

During operation of the up-lock apparatus 205, when the up-lock apparatus 205 is in the release state, continued upward movement of the up-lock roller pin 215 of the landing gear 105 causes the piston rod 350 of the up-lock actuator 310 to retract within the cylinder 355. When the piston rod 350 fully retracts, the piston head 705 may rotate to a first rotation state. At this stage, the up-lock actuator 310 enters a restricted extension state in which the rod-side cam profile 720 of the piston head 705 engages the rod-end cam profile 715 of the cylinder 355 to prevent the piston rod 350 from fully extending from the cylinder 355. At this point, the hook member 305 of the up-lock apparatus 205 enters the locked state.

When the hook member 305 of the up-lock apparatus 205 is in the locked state, upward movement of the up-lock roller pin 215 causes the up-lock roller pin 215 of the landing gear 105 to engage the upper-jaw section 335 of the hook member 305. Engagement of the upper-jaw section 335 causes the hook member 305 to rotate about the hook pin 315 so that the upper-jaw section 335 moves in an upward direction with the up-lock roller pin 215. Rotation of the hook member 305 causes the piston rod 350 of the up-lock actuator 310 to retract within the cylinder 355. When the piston rod 350 fully retracts, the piston head 705 may rotate to a second rotation state. At this stage, the piston rod 350 of the up-lock actuator 310 is allowed to extend fully, and the hook member 305 of the up-lock apparatus 205 enters the released state.

Figure 8:
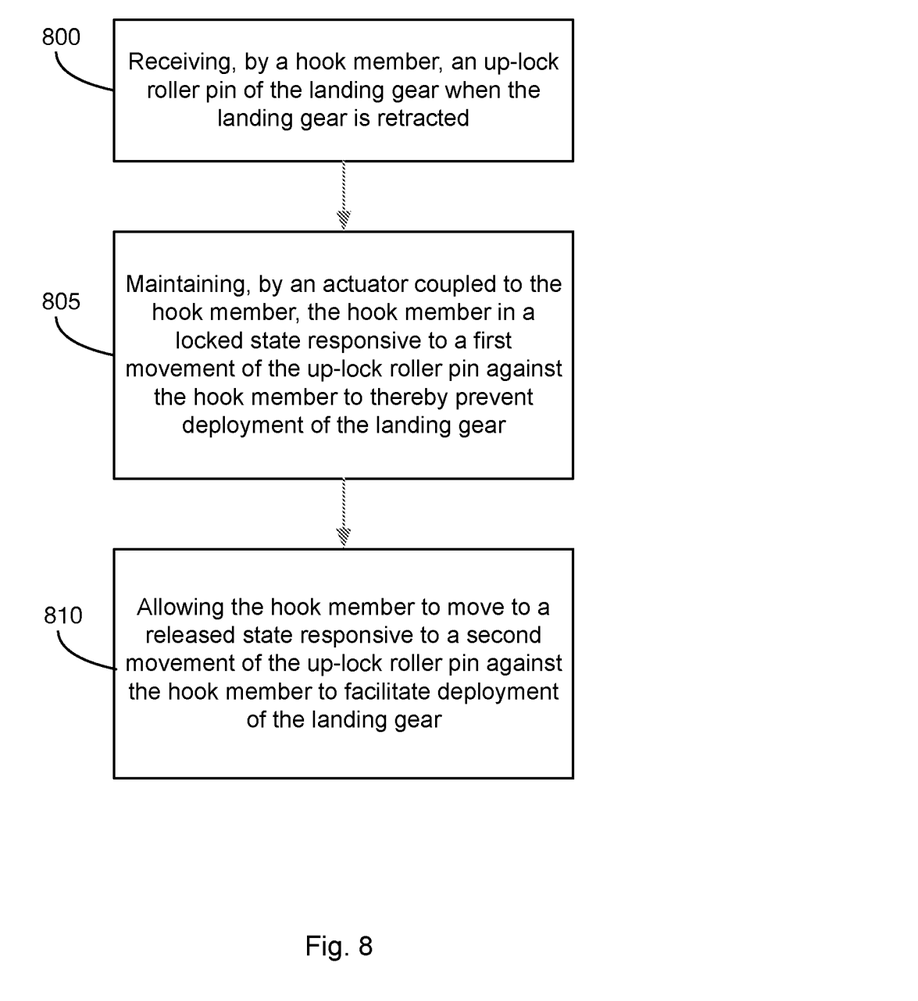
FIG. 8 illustrates a method for securing landing gear of an aircraft.

FIG. 8 illustrates a method for securing landing gear 105 of an aircraft 100. Block 800 may involve receiving, by a hook member 305, an up-lock roller pin 215 of the landing gear 105 when the landing gear 105 is retracted.

Block 805 may involve maintaining, by an up-lock actuator 310 coupled to the hook member 305, the hook member 305 in a locked state responsive to a first movement of the up-lock roller pin 215 against the hook member 305 to thereby prevent deployment of the landing gear 105.

Block 810 may involve allowing the hook member 305 to move to a released state responsive to a second movement of the up-lock roller pin 215 against the hook member 305 to facilitate deployment of the landing gear 105.

Some examples may involve engaging, by the up-lock roller pin 215, an upper-jaw section 335 of the hook member 305 during the first movement and the second movement of the up-lock roller pin 215 against the hook member 305; and supporting, by a lower-jaw section 340 of the hook member 305, the up-lock roller pin 215 when the landing gear 105 is retracted.

Some examples may involve moving a piston of the up-lock actuator 310 longitudinally within a cylinder 355 of the up-lock actuator 310 between a cap-end of the cylinder 355 and a rod-end 358 of the cylinder 355; rotating a head of the piston, relative to the cylinder 355, to a first rotation state responsive to engagement, by a head cam profile of the head of the piston, of a first cam profile proximate the cap-end of the cylinder 355 during the first movement of the up-lock roller pin 215 against the hook member 305; and rotating the head of the piston, relative to the cylinder 355, to a second rotation state responsive to engagement, by the head cam profile of the head of the piston, of the first cam profile proximate the cap-end of the cylinder 355 during the second movement of the up-lock roller pin 215 against the hook member 305.

Some examples may involve extending a piston rod 350 of the piston by a first amount when the head is rotated to the first rotation state, and extending the piston rod 350 of the piston by a second amount, greater than the first amount, when the head is rotated to the second rotation state.

While the systems and methods of operation have been described with reference to certain examples, it will be understood by those skilled in the art that various changes may be made and equivalents may be substituted without departing from the scope of the claims. Therefore, it is intended that the present methods and systems not be limited to the particular example disclosed, but that the disclosed methods and systems include all embodiments falling within the scope of the appended claims.

What is claimed is:

1. An up-lock apparatus for landing gear of an aircraft, the up-lock apparatus comprising:
   a hook member configured to receive an up-lock roller pin of the landing gear when the landing gear is retracted; and
   an up-lock actuator, coupled to the hook member, configured to maintain the hook member in a locked state responsive to a first movement of the up-lock roller pin against the hook member to thereby prevent deployment of the landing gear, and to allow the hook member to move to a released state responsive to a second movement of the up-lock roller pin against the hook member to facilitate deployment of the landing gear, wherein the up-lock actuator comprises:
   a cylinder; and
   a piston configured to move longitudinally within the cylinder between a cap-end of the cylinder and a rod-end of the cylinder.

2. The up-lock apparatus according to claim 1, further comprising a hook pin, wherein the hook member is configured to rotate about the hook pin from the released state to the locked state as the up-lock roller pin moves into the hook member.

3. The up-lock apparatus according to claim 1, wherein the hook member defines a jaw to receive the up-lock roller pin of the landing gear, wherein the jaw comprises:
   an upper-jaw section configured to be engaged by the up-lock roller pin during the first movement and the second movement of the up-lock roller pin against the hook member; and
   a lower-jaw section configured to support the up-lock roller pin when the landing gear is retracted.

4. The up-lock apparatus according to claim 1, wherein the cylinder comprises:

a first cam profile proximate the cap-end of the cylinder; and
a second cam profile proximate the rod-end of the cylinder.

5. The up-lock apparatus according to claim 4, wherein the piston comprises:
   a piston rod; and
   a piston head coupled to an end of the piston rod, wherein the piston head comprises a piston head cam profile configured to: (i) engage the first cam profile of the cylinder during the first movement of the up-lock roller pin against the hook member to cause the piston head to rotate, relative to the cylinder, to a first rotation state, and (ii) engage the first cam profile of the cylinder during the second movement to cause the piston head to rotate, relative to the cylinder, to a second rotation state.

6. The up-lock apparatus according to claim 5, wherein the piston head cam profile is further configured to engage the second cam profile of the cylinder during extension of the piston, wherein the piston head cam profile and the second cam profile of the cylinder are configured to allow the piston rod to extend by a first amount when the piston head is rotated to the first rotation state, and to allow the piston rod to extend by a second amount, greater than the first amount, when the piston head is rotated to the second rotation state.

7. The up-lock apparatus according to claim 5, further comprising a coupler rotatably coupled to a second end of the piston rod, wherein the coupler facilitates coupling the piston to the hook member.

8. The up-lock apparatus according to claim 5, wherein the piston rod rotates with the piston head, wherein the up-lock apparatus further comprise a auxiliary locking mechanism configured to engage the piston rod of the piston, wherein when engaged, the auxiliary locking mechanism prevents rotation of the piston rod.

9. The up-lock apparatus according to claim 1, further comprising a resilient member coupled to the hook member, wherein the resilient member is configured to urge the hook member towards the released state.

10. The up-lock apparatus according to claim 1, further comprising a sensor in mechanical communication with the hook member configured to facilitate determination of whether the hook member is in the locked state or the released state.

11. An aircraft comprising:
    landing gear that comprises an up-lock roller pin; and
    an up-lock apparatus, wherein the up-lock apparatus comprises:
    a hook member configured to receive the up-lock roller pin of the landing gear when the landing gear is retracted; and
    an up-lock actuator, coupled to the hook member, configured to maintain the hook member in a locked state responsive to a first movement of the up-lock roller pin against the hook member to thereby prevent deployment of the landing gear, and to allow the hook member to move to a released state responsive to a second movement of the up-lock roller pin against the hook member to facilitate deployment of the landing gear, wherein the up-lock actuator comprises:
    a cylinder; and
    a piston configured to move longitudinally within the cylinder between a cap-end of the cylinder and a rod-end of the cylinder.

12. The aircraft according to claim 11, wherein the hook member defines a jaw to receive the up-lock roller pin of the landing gear, wherein the jaw comprises:
   an upper-jaw section configured to be engaged by the up-lock roller pin during the first movement and the second movement of the up-lock roller pin against the hook member; and
   a lower-jaw section configured to support the up-lock roller pin when the landing gear is retracted.

13. The aircraft according to claim 11, wherein the piston comprises:
   a piston rod; and
   a piston head coupled to an end of the piston rod, wherein the piston head comprises a piston head cam profile configured to: (i) engage a first cam profile of the cylinder proximate the cap-end of the cylinder during the first movement of the up-lock roller pin against the hook member to cause the piston head to rotate, relative to the cylinder, to a first rotation state, and (ii) engage the first cam profile of the cylinder during the second movement to cause the piston head to rotate, relative to the cylinder, to a second rotation state.

14. The aircraft according to claim 13, wherein the piston head cam profile is further configured to engage a second cam profile proximate the rod-end of the cylinder during extension of the piston, wherein the piston head cam profile and the second cam profile of the cylinder are configured to allow the piston rod to extend by a first amount when the piston head is rotated to the first rotation state, and to allow the piston rod to extend by a second amount, greater than the first amount, when the piston head is rotated to the second rotation state.

15. A method for securing landing gear of an aircraft, the method comprising:
   receiving, by a hook member, an up-lock roller pin of the landing gear when the landing gear is retracted; and
   maintaining, by an up-lock actuator coupled to the hook member, the hook member in a locked state responsive to a first movement of the up-lock roller pin against the hook member to thereby prevent deployment of the landing gear; and
   allowing the hook member to move to a released state responsive to a second movement of the up-lock roller pin against the hook member to facilitate deployment of the landing gear;
   moving a piston of the up-lock actuator longitudinally within a cylinder of the up-lock actuator between a cap-end of the cylinder and a rod-end of the cylinder;
   rotating a piston head of the piston, relative to the cylinder, to a first rotation state responsive to engagement, by a piston head cam profile of the piston head of the piston, of a first cam profile proximate the cap-end of the cylinder during the first movement of the up-lock roller pin against the hook member; and
   rotating the piston head of the piston, relative to the cylinder, to a second rotation state responsive to engagement, by the piston head cam profile of the piston head of the piston, of the first cam profile proximate the cap-end of the cylinder during the second movement of the up-lock roller pin against the hook member.

16. The method according to claim 15, further comprising:
   engaging, by the up-lock roller pin, an upper-jaw section of the hook member during the first movement and the second movement of the up-lock roller pin against the hook member; and
   supporting, by a lower-jaw section of the hook member, the up-lock roller pin when the landing gear is retracted.

17. The method according to claim 15, further comprising:
   extending a piston rod of the piston by a first amount when the piston head is rotated to the first rotation state, and
   extending the piston rod of the piston by a second amount, greater than the first amount, when the piston head is rotated to the second rotation state.

18. The aircraft according to claim 11, further comprising a hook pin, wherein the hook member is configured to rotate about the hook pin from the released state to the locked state as the up-lock roller pin moves into the hook member.

19. The aircraft according to claim 11, wherein the cylinder comprises:
   a first cam profile proximate the cap-end of the cylinder; and
   a second cam profile proximate the rod-end of the cylinder.

20. The aircraft according to claim 11, further comprising a resilient member coupled to the hook member, wherein the resilient member is configured to urge the hook member towards the released state.

* * * * *